United States Patent
Liu et al.

(10) Patent No.: US 11,440,819 B2
(45) Date of Patent: Sep. 13, 2022

(54) DOSING CONTROL METHOD AND SYSTEM FOR MICRO-FLOCCULATION IN ULTRAFILTRATION

(71) Applicant: Greentech Environment Co., Ltd., Beijing (CN)

(72) Inventors: Mu Liu, Beijing (CN); Yingqiang Su, Beijing (CN); Zehua Li, Beijing (CN); Kai Sun, Beijing (CN); Xiaofeng Lin, Beijing (CN); Huiming Han, Beijing (CN); Mengyuan Duan, Beijing (CN); Liyan Zhang, Beijing (CN)

(73) Assignee: Greentech Environment Co., Ltd., Beijing (CN)

( * ) Notice: Subject to any disclaimer, the term of this patent is extended or adjusted under 35 U.S.C. 154(b) by 0 days.

(21) Appl. No.: 17/703,953

(22) Filed: Mar. 24, 2022

(65) Prior Publication Data
US 2022/0212963 A1 Jul. 7, 2022

(30) Foreign Application Priority Data

May 31, 2021 (CN) .......................... 202110603298.5

(51) Int. Cl.
*C02F 1/44* (2006.01)
*C02F 1/00* (2006.01)
(Continued)

(52) U.S. Cl.
CPC ............ *C02F 1/444* (2013.01); *B01D 61/145* (2013.01); *B01D 61/22* (2013.01); *C02F 1/008* (2013.01);
(Continued)

(58) Field of Classification Search
CPC ........ C02F 1/008; C02F 1/444; C02F 1/5209; C02F 1/52; C02F 9/00; B01D 21/01;
(Continued)

(56) References Cited

U.S. PATENT DOCUMENTS

2009/0211974 A1    8/2009    Bonnelye et al.

FOREIGN PATENT DOCUMENTS

CN        104925989 A        9/2015
CN        105858961 A        8/2016
(Continued)

*Primary Examiner* — Terry K Cecil

(57) ABSTRACT

A dosing control method for micro-flocculation in ultrafiltration, including: calculating a preset value of a first differential pressure before an initial backwash and a preset value of a second differential pressure before a final backwash in each chemically enhanced backwash cycle; calculating a preset value of a third differential pressure between the first differential pressure and the second differential pressure according to the preset value of the first differential pressure and the preset value of the second differential pressure; obtaining a predicted value of the third differential pressure according to a differential pressure curve plotted based on online filtration differential pressure data; and comparing the preset value of the third differential pressure and the predicted value of the third differential pressure to determine whether to dose. A dosing control system is also provided.

6 Claims, 2 Drawing Sheets

(51) Int. Cl.
*B01D 61/22* (2006.01)
*C02F 9/00* (2006.01)
*C02F 1/52* (2006.01)
*B01D 61/14* (2006.01)
*B01D 65/02* (2006.01)

(52) U.S. Cl.
CPC .............. *C02F 1/5209* (2013.01); *C02F 9/00* (2013.01); *B01D 65/02* (2013.01); *C02F 1/52* (2013.01)

(58) Field of Classification Search
CPC ...... B01D 21/08; B01D 61/145; B01D 61/22; B01D 65/02
See application file for complete search history.

(56) References Cited

FOREIGN PATENT DOCUMENTS

| | | | |
|---|---|---|---|
| CN | 206279009 U | 6/2017 | |
| CN | 213160245 U | 5/2021 | |
| KR | 100736513 B1 * | 7/2007 | ............ C02F 1/5209 |
| WO | WO-2015045574 A1 * | 4/2015 | ............ B01D 61/22 |

* cited by examiner

DOSING CONTROL METHOD AND SYSTEM FOR MICRO-FLOCCULATION IN ULTRAFILTRATION

CROSS-REFERENCE TO RELATED APPLICATIONS

This application claims the benefit of priority from Chinese Patent Application No. 202110603298.5, filed on May 31, 2021. The content of the aforementioned application, including any intervening amendments thereto, is incorporated herein by reference in its entirety.

TECHNICAL FIELD

This application relates to wastewater treatment, and more specifically to a dosing control method and system for micro-flocculation in ultrafiltration.

BACKGROUND

Ultrafiltration is a membrane filtration technology that is commonly used in water treatment, especially in the advanced feedwater treatment and the upgrading treatment of wastewater. However, with the operation of an ultrafiltration membrane system, the increasingly accumulated pollutants will block the membrane, increasing the energy consumption and even reducing the water output of the system.

Currently, a flocculant may be introduced through a water inlet end of the ultrafiltration membrane system to initiate the micro-flocculation reaction, so that organic pollutants in the raw water, such as colloids having a particle size smaller than the membrane pore size, will aggregate into larger particles under the action of the flocculant, failing to enter the membrane pores. In addition, the particles formed from the micro-flocculation will be loosely accumulated on the membrane surface, which can facilitate the interception and removal of the pollutants, so as to improve the membrane filtration performance and facilitate the cleaning of the membrane surface.

However, with respect to the existing flocculant dosing systems, the flocculant dosage is directly controlled through adjusting the frequency of the dosing pump according to the manual judgment for changes in the feedwater quality and the operating state of the ultrafiltration membrane. If there is a sharp variation in the water quality or the operating state of the ultrafiltration membrane, the dosage adjustment will be delayed and fail to meet the requirement in time, resulting in the instability and even failure of the system.

SUMMARY

An objective of the present disclosure is to provide a dosing control method and system for micro-flocculation in ultrafiltration, so as to solve the technical problems mentioned above.

In a first aspect, this application provides a dosing control method for micro-flocculation in ultrafiltration, comprising:

1) calculating a preset value of a first differential pressure before an initial backwash and a preset value of a second differential pressure before a final backwash in each chemically enhanced backwash cycle according to an operation condition and quality of raw water;

2) calculating a preset value of a third differential pressure between the first differential pressure and the second differential pressure according to the preset value of the first differential pressure and the preset value of the second differential pressure;

3) starting a filtration system;

4) obtaining a predicted value of the third differential pressure according to a differential pressure curve plotted based on online filtration differential pressure data;

5) comparing the predicted value of the third differential pressure with the preset value of the third differential pressure to obtain a first judgement result, and recording a duration that the first judgement result remains unchanged;

6) if the first judgement result indicates that the predicted value of the third differential pressure is greater than the preset value of the third differential pressure, and the duration that the first judgement result remains unchanged is less than a first preset duration, performing a dosing operation at a preset dosage;

7) if the first judgement result indicates that the predicted value of the third differential pressure is greater than the preset value of the third differential pressure, and the duration that the first judgement result remains unchanged is no less than the first preset duration, performing a dosing operation at an increased dosage; and 8) if the first judgement result indicates that the predicted value of the third differential pressure is smaller than or equal to the preset value of the third differential pressure, and the duration that the first judgement result remains unchanged is no less than a second preset duration, stopping the dosing operation.

In the dosing control method provided herein, the preset value of the third differential pressure is obtained according to the preset values of the first differential pressure and the second differential pressure; the predicted value of the third differential pressure is obtained according to the differential pressure curve plotted based on the online filtration differential pressure data; the predicted value of the third differential pressure is compared with the preset value of the third differential pressure to obtain a judgement result, and the duration that the judgement result keeps unchanged is recorded. When the predicted value of the third differential pressure is greater than the preset value of the third differential pressure, the dosing operation is performed. When the predicted value of the third differential pressure is greater than the preset value of the third differential pressure, and the duration is greater than or equal to the first preset duration, the dosing operation is performed at an increased dosage. When the predicted value of the third differential pressure is less than or equal to the preset value of the third differential pressure, and the duration is greater than or equal to the second preset duration, the dosing operation is stopped. In this way, the operation state of an ultrafiltration system can be effectively monitored, and the dosing state or dosage can be adjusted timely according to the operating state, so as to enable the stable operation of an ultrafiltration system.

In addition, by means of the precise control of the dosage, the chemical consumption can be reduced and the membrane pollution can be alleviated, facilitating extending the chemical cleaning cycle and the service life of the ultrafiltration membrane. Therefore, the operation and management of water treatment is simplified and the cost of water reproduction is reduced.

In an embodiment, the step (3) is performed through steps of:

operating the filtration system; and performing the dosing operation at the preset dosage continuously for a first dosing duration.

In an embodiment, the step (7) further comprises:

starting a timing operation with a preset second dosing duration as a timing cycle;

continuously performing the dosing operation in each timing cycle;

monitoring the predicted value of the third differential pressure in real time and comparing the predicted value of the third differential pressure with the preset value of the third differential pressure in real time to obtain a second judgement result; and recording a duration that the second judgement result keeps unchanged;

if the second judgement result indicates that the predicted value of the third differential pressure is less than or equal to the preset value of the third differential pressure within one timing cycle, and the duration that the second judgement result keeps unchanged is not less than the second preset duration, stopping the dosing operation;

if the second judgement result indicates that the predicted value of the third differential pressure is greater than the preset value of the third differential pressure at an end of one timing cycle, performing the dosing operation at an increased dosage; and if the second judgement result indicates that the predicted value of the third differential pressure is less than or equal to the preset value of the third differential pressure within one timing cycle, the second judgement result is kept until an end of one timing cycle, and the duration that the second judgement result remains unchanged is less than the second preset duration, performing the dosing operation at an increased dosage and continuing performing the timing operation; and when the duration that the second judgement result remains unchanged is no less than the second preset duration, stopping the dosing operation.

In an embodiment, the second dosing duration is greater than the first preset duration.

In an embodiment, if a cumulative duration that the predicted value of the third differential pressure is less than or equal to the preset value of the third differential pressure is no less than the second preset duration within the second dosing duration, and then a cumulative duration that the predicted value of the third differential pressure is greater than the preset value of the third differential pressure is no less than the first preset duration, dosing time is extended, and a dosage is no longer controlled according to a differential pressure until an end of a filtration.

In an embodiment, if a cumulative duration that the predicted value of the third differential pressure is less than or equal to the preset value of the third differential pressure is no less than the second preset duration within the second dosing duration, and then a cumulative duration that the predicted value of the third differential pressure is greater than the preset value of the third differential pressure is no less than the first preset duration, a dosing failure is determined, and an alarm is generated to allow an operator to check a dosing condition.

In a second aspect, this application also provides a dosing control system for micro-flocculation in ultrafiltration, comprising:

an ultrafiltration assembly;
a water production assembly; and
a first dosing assembly;

wherein the ultrafiltration assembly comprises a first water inlet pipeline and an ultrafiltration membrane module; and the first water inlet pipeline is communicated with a water inlet end of the ultrafiltration membrane module;

the water production assembly is communicated with a water outlet end of the ultrafiltration membrane module;

the first dosing assembly comprises an intelligent dosing assembly and a first dosing pipeline; and the first dosing pipeline is communicated with the first water inlet pipeline.

In an embodiment, the ultrafiltration assembly comprises a water inlet tank; a filter is provided between the water inlet tank and the ultrafiltration membrane module; and the first dosing pipeline is communicated with a part of the first water inlet pipeline between the filter and the ultrafiltration membrane module.

In an embodiment, the dosing control system further comprises a restorative chemical cleaning assembly; and the restorative chemical cleaning assembly is communicated with the first water inlet pipeline.

In an embodiment, the dosing control system also comprises a second dosing assembly; and the second dosing assembly comprises a second dosing pipeline;

the water production assembly comprises a water production pipeline, a backwash tank, and a second water inlet pipeline; one end of the water production pipeline is communicated with the water outlet end of the ultrafiltration membrane module, and the other end of the water production pipeline is communicated with the backwash tank; and one end of the second water inlet pipeline is communicated with the backwash tank, and the other end of the second water inlet pipeline is communicated with the water outlet end of the ultrafiltration membrane module; and the second dosing pipeline is communicated with the second water inlet pipeline.

BRIEF DESCRIPTION OF THE DRAWINGS

The present disclosure will be further described below with reference to the accompanying drawings and embodiments to completely and clearly explain the principles of the present disclosure.

The accompany drawings of the prior art and the embodiments provided herein will be briefly described below to render the technical solutions of the prior art and the embodiments provided herein clearer. Obviously, other drawings can be obtained by those of ordinary skill in the art without paying any creative effort.

Figure 1:
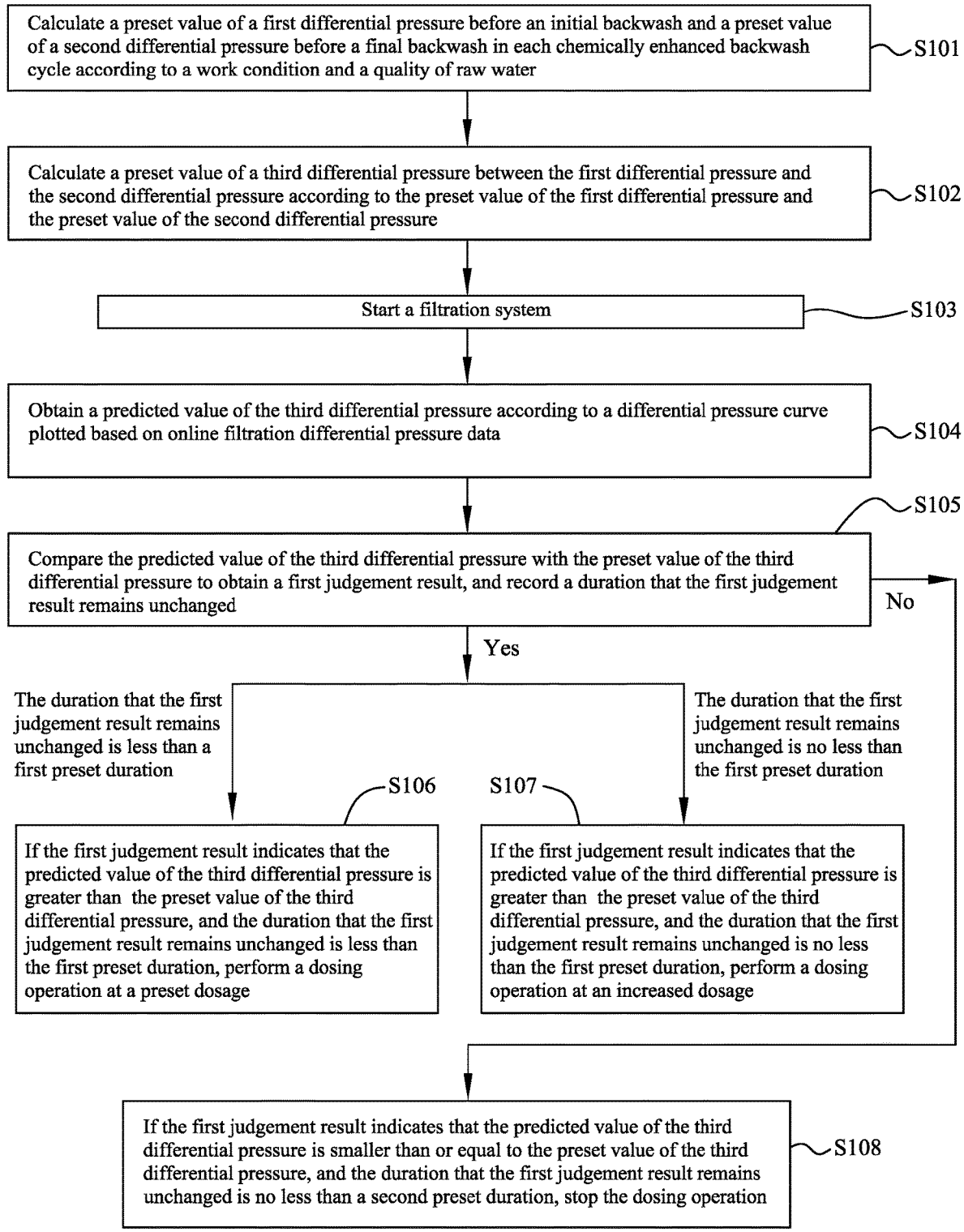
FIG. 1 is a flow chart of a dosing control method for micro-flocculation in ultrafiltration according to an embodiment of the present disclosure.

In the drawings: 1, raw water feed pipeline; 2, water inlet tank; 3, water supply pump; 4, filter; 5, first water inlet flowmeter; 6, first water inlet automatic valve; 7, water inlet pressure gauge; 8, first water inlet pipeline; 9, ultrafiltration membrane module; 10, backwash drainage automatic valve; 11, backwash drainage pipeline; 12, water production pressure gauge; 13, water production automatic valve; 14, second water inlet automatic valve; 15, first dosing pipeline; 16, water production pipeline; 17, inlet return pipeline; 18, water production return pipeline; 19, second water inlet pipeline; 20, third water inlet pipeline; 21, water production drainage pipeline; 22, intelligent dosing assembly; 23, second dosing pipeline, 24, second dosing assembly; 25, cleaning device; 26, second water inlet flowmeter; 27, backwash pump; and 28, backwash tank.

DETAILED DESCRIPTION OF EMBODIMENTS

The disclosure will be described in detail below to make the object, technical solutions and beneficial effects of the present disclosure clearer. It should be noted that the embodiments of the present disclosure and the features therein may be combined with each other in the absence of contradictions.

The embodiments provided below are intended to facilitate the understanding of the present disclosure, and the implementation of the present disclosure is not limited thereto. Obviously, the embodiments provided below are merely some embodiments of the present disclosure, and are not intended to limit the present disclosure.

As shown in FIG. 1, a dosing control method is provided for micro-flocculation in the ultrafiltration, which is performed through the following steps.

(S101) A preset value of a first differential pressure before an initial backwash and a preset value of a second differential pressure before a final backwash in each chemically enhanced backwash cycle are calculated according to a work condition and quality of raw water.

(S102) A preset value of a third differential pressure between the first differential pressure and the second differential pressure is calculated according to the preset value of the first differential pressure and the preset value of the second differential pressure.

(S103) A filtration system is started.

(S104) A predicted value of the third differential pressure is obtained according to a differential pressure curve plotted based on online filtration differential pressure data.

(S105) The predicted value of the third differential pressure with the preset value of the third differential pressure are compared to obtain a first judgement result, and a duration that the first judgement result remains unchanged is recorded.

(S106) If the first judgement result indicates that the predicted value of the third differential pressure is greater than the preset value of the third differential pressure and the duration that the first judgement result remains unchanged is less than a first preset duration, a dosing operation is performed at a preset dosage.

(S107) If the first judgement result indicates that the predicted value of the third differential pressure is greater than the preset value of the third differential pressure, and the duration that the first judgement result remains unchanged is no less than the first preset duration, a dosing operation is performed at an increased dosage.

(S108) If the first judgement result indicates that the predicted value of the third differential pressure is smaller than or equal to the preset value of the third differential pressure, and the duration that the first judgement result remains unchanged is no less than a second preset duration, the dosing operation is stopped.

In the dosing control method provided herein, the preset value of the third differential pressure is obtained according to the preset values of the first differential pressure and the second differential pressure; the predicted value of the third differential pressure is obtained according to the differential pressure curve plotted based on the online filtration differential pressure data; the predicted value of the third differential pressure is compared with the preset value of the third differential pressure to obtain a judgement result, and the duration that the judgement result keeps unchanged is recorded. When the predicted value of the third differential pressure is greater than the preset value of the third differential pressure, the dosing operation is performed. When the predicted value of the third differential pressure is greater than the preset value of the third differential pressure, and the duration is greater than or equal to the first preset duration, the dosing operation is performed at an increased dosage. When the predicted value of the third differential pressure is less than or equal to the preset value of the third differential pressure, and the duration is greater than or equal to the second preset duration, the dosing operation is stopped. In this way, the operation state of an ultrafiltration system can be effectively monitored, and the dosing state or dosage can be adjusted timely according to the operating state, so as to enable the stable operation of an ultrafiltration system.

In addition, by means of the precise control of the dosage, the chemical consumption can be reduced and the membrane pollution can be alleviated, facilitating extending the chemical cleaning cycle and the service life of the ultrafiltration membrane. Therefore, the operation and management of water treatment is simplified and the cost of water reproduction is reduced.

In the following embodiment, the first preset duration is 3 min, the second preset duration is 5 min, and the first dosing duration and the second dosing duration are both 10 min as an example.

In an embodiment, the step (3) is performed through the following steps.

The filtration system is operated.

The dosing operation is performed at the preset dosage continuously for 10 min.

According to the first judgement result mentioned above, the following steps are performed.

If the first judgement result indicates that the predicted value of the third differential pressure is less than or equal to the preset value of the third differential pressure, and the duration that the first judgement result remains unchanged is no less than 5 min, the dosing operation is stopped.

If the first judgement result indicates that the predicted value of the third differential pressure is greater than the preset value of the third differential pressure and the duration that the first judgement result remains unchanged is less than 3 min, the dosing operation is performed. If the duration that the first judgement result remains unchanged is no less than 3 min, the dosing operation is performed at an increased dosage. When the predicted value of the third differential pressure is less than or equal to the preset value of the third differential pressure, and the duration that the predicted value of the third differential pressure is less than or equal to the preset value of the third differential pressure is no less than 5 min, the dosing operation is stopped.

When the first judgement result indicates that the predicted value of the third differential pressure is greater than the preset value of the third differential pressure and the duration that the first judgement result remains unchanged is no less than 3 min, the dosing operation is performed with an increased dosage and a timing operation is started with 10 min as a timing cycle. The dosing operation is continuously performed in each timing cycle. The predicted value of the third differential pressure is monitored in real time and the preset value of the third differential pressure and the predicted value of the third differential pressure are compared in real time.

If the predicted value of the third differential pressure is less than or equal to the preset value of the third differential pressure within one timing cycle, and such sate is no less than 5 min, the dosing operation is stopped.

If the predicted value of the third differential pressure is greater than the preset value of the third differential pressure at an end of one timing cycle, the dosing operation is continued with an increased dosage.

If the predicted value of the third differential pressure is less than or equal to the preset value of the third differential pressure within one timing cycle, and such state is still kept at an end of one timing cycle but a duration that such state remains unchanged is less than 5 min, the dosing operation is continued with an increased dosage and the timing operation is continued. When the predicted value of the third differential pressure is less than or equal to the preset value of the third differential pressure for no less than 5 min, the dosing operation is stopped.

In an embodiment, in an operation of increasing a dosage, the dosage may be increased by 0.05 ppm.

In an embodiment, if a cumulative duration that the predicted value of the third differential pressure is less than or equal to the preset value of the third differential pressure is no less than 5 min within the second dosing duration of 10 min, and then a cumulative duration that the predicted value of the third differential pressure is greater than the preset value of the third differential pressure is no less than 3 min, dosing time is extended and a dosage is no longer controlled according to a differential pressure until an end of a filtration.

In an embodiment, if a cumulative duration that the predicted value of the third differential pressure is less than or equal to the preset value of the third differential pressure is no less than 5 min within the second dosing duration of 10 min, and then a cumulative duration that the predicted value of the third differential pressure is greater than the preset value of the third differential pressure is no less than 3 min, a dosing failure is determined, and an alarm is generated to allow an operator to check a dosing condition.

Figure 2:
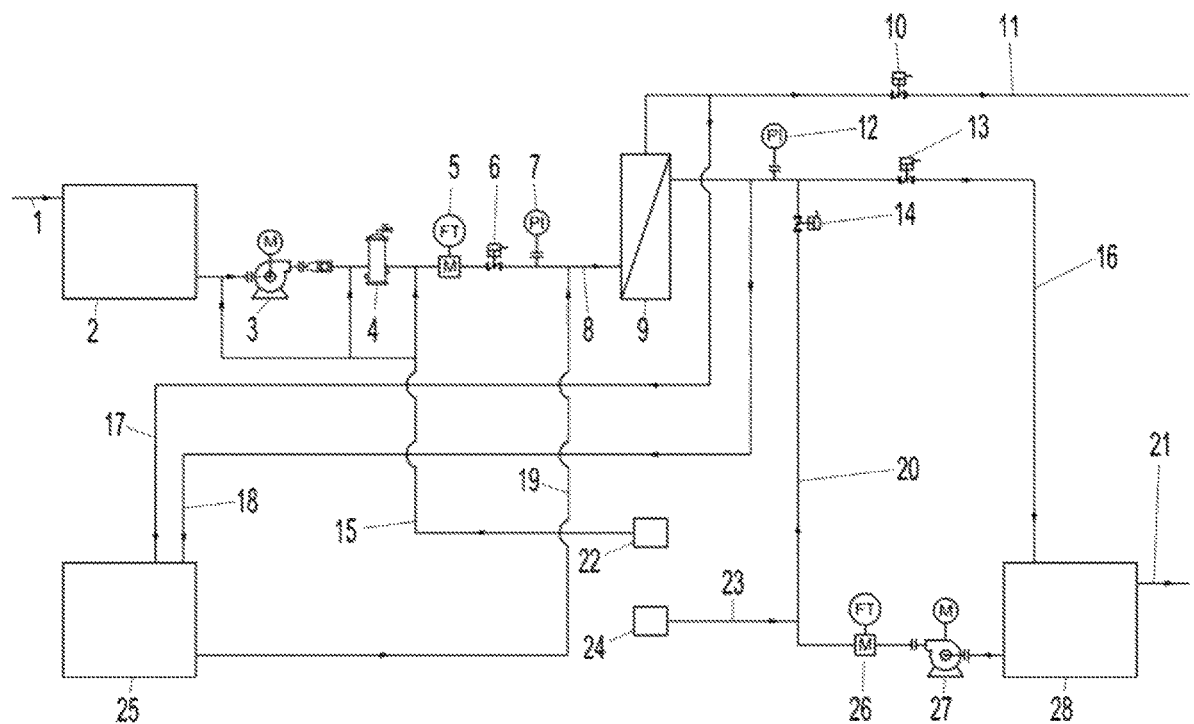
FIG. 2 is a schematic diagram of a dosing control system for micro-flocculation in ultrafiltration according to an embodiment of the disclosure.

As shown in FIG. 2, provided herein is a dosing control system for micro-flocculation in ultrafiltration.

The dosing control system includes an ultrafiltration assembly, a water production assembly and a first dosing assembly.

The ultrafiltration assembly includes a first water inlet pipeline 8 and an ultrafiltration membrane module 9. The first water inlet pipeline 8 is communicated with a water inlet end of the ultrafiltration membrane module 9.

The water production assembly is communicated with a water outlet end of the ultrafiltration membrane module 9.

The first dosing assembly includes an intelligent dosing assembly 22 and a first dosing pipeline 15. The first dosing pipeline 15 is communicated with the first water inlet pipeline 8.

In an embodiment, the first dosing assembly is communicated with the first water inlet pipeline 8 through the first dosing pipeline 15, so as to communicate with the ultrafiltration membrane module 9, so that a chemical can be added to the filter membrane group 9 through the first dosing assembly.

In an embodiment, the ultrafiltration assembly includes a raw water feed pipeline 1, a water inlet tank 2, a water supply pump 3, a filter 4, a first water inlet flowmeter 5, a first water inlet automatic valve 6, a water inlet pressure gauge 7, the first water inlet pipeline 8 and the ultrafiltration membrane module 9.

The water inlet tank 2 has a concrete structure to provide sufficient buffer time for the ultrafiltration water supply. The water supply pump 3 is a horizontal centrifugal pump to provide sufficient pressure for a filtration operation of the ultrafiltration membrane module 9. In addition, an ultrafiltration lift pump adopts a variable-frequency and constant-flow control mode, and specifically, a signal of an effluent flow is fed back to a converter of the ultrafiltration lift pump to adjust a rotary speed of the ultrafiltration lift pump, such that a pumped flow matches a preset running flow, so as to provide a stable water production for an ultrafiltration system. The filter 4 is a self-cleaning filter 4 to provide protection for the ultrafiltration membrane module 9 through preventing large particle matters, such as sand particles, from entering the membrane group and damaging a membrane element. The first water inlet flowmeter 5 is an electromagnetic flowmeter, which provides a flow feedback for an operation of the ultrafiltration system, so as to adjust a frequency of the water supply pump 3 to maintain a constant liquid level in the water inlet tank. The water inlet pressure gauge 7 is an online pressure transmitter, and is configured to provide a real-time record of a water inlet pressure during an ultrafiltration operation, so as to determine a pollution trend of the ultrafiltration membrane module 9. The ultrafiltration membrane module 9 is an internal pressure ultrafiltration membrane module 9, which can filtrate and separate raw water to remove a suspended matter to make production water be free of the suspended matter.

The first dosing assembly is configured to dose an ultrafiltration inlet water using a mechanical diaphragm pump. In this way, a pretreatment of the ultrafiltration inlet water is enhanced through micro-flocculation, reducing the pollution to an ultrafiltration membrane.

The first dosing assembly includes the intelligent dosing assembly 22 and the first dosing pipeline 15.

In an embodiment, the first dosing pipeline 15 is communicated with a part of the first water inlet pipeline 8 between the water inlet tank 2 and the water supply pump 3. In an embodiment, the first dosing pipeline 15 is communicated with a part of the first water inlet pipeline 8 between the water supply pump 3 and the filter 4. In an embodiment, the first dosing pipeline 15 is communicated with a part of the first water inlet pipeline 8 between the filter 4 and the ultrafiltration membrane module 9.

The water production assembly includes a water production pressure gauge 12, a water production automatic valve 13, a water production pipeline 16, a water production drainage pipeline 21, a backwash tank 28, a backwash pump 27, a second water inlet flowmeter 26, a third water inlet pipeline 20 and a second water inlet automatic valve 14.

The water production pressure gauge 12 is an online pressure transmitter, and is configured to provide a real-time record of a water production pressure during the ultrafiltration operation to prevent a back pressure in a pipeline of a water production side. The backwash tank has a concrete structure to provide enough backwash water for ultrafiltration backwash. The backwash pump is a horizontal centrifugal pump, and is configured to provide sufficient flow and pressure for backwash of the ultrafiltration membrane, so as to remove a blocked substance including a suspended solid, a colloid and a large particle to restore a water flux of the ultrafiltration membrane. The backwash pump adopts a variable-frequency and constant-flow control mode. A signal of an effluent flow is fed back to a converter of the backwash pump to adjust a rotary speed of the backwash pump, so as to provide a constant water inlet flow for the ultrafiltration backwash to ensure a backwash effect. The second water inlet flowmeter 26 is an electromagnetic flowmeter, and is configured to provide a flow feedback during the ultrafiltration backwash, so as to adjust a frequency of the backwash pump and maintain a constant backwash water inlet flow.

In an embodiment, the dosing control system further includes a restorative chemical cleaning assembly. The restorative chemical cleaning assembly is communicated with the first water inlet pipeline 8.

The restorative chemical cleaning assembly includes a cleaning device 25, an inlet return pipeline 17 and a water production return pipeline 18. The cleaning device 25 is communicated with the first water inlet pipeline 8 through a second water inlet pipeline 19. The inlet return pipeline is communicated with a backwash drainage pipeline 11. The water production return pipeline is communicated with the water production pipeline 16.

In an embodiment, the dosing control system also includes a second dosing assembly 24. The second dosing assembly includes a second dosing pipeline 23. One end of the water production pipeline 16 is communicated with the water outlet end of the ultrafiltration membrane module, and the other end of the water production pipeline 16 is communicated with the backwash tank 28; and one end of the third water inlet pipeline 20 is communicated with the backwash tank 28, and the other end of the third water inlet pipeline 20 is communicated with the water outlet end of the ultrafiltration membrane module. The second dosing pipeline 23 is communicated with the third water inlet pipeline 20.

In the dosing control system, when the ultrafiltration system is started to operate, a program-controlled system turns on the first water inlet automatic valve 6 and the water production automatic valve 13, and then turns on the water supply pump 3. At the same time, the first dosing assembly is turned on to start a dosing operation. At this time, the raw water is lifted by the water supply pump 3, so as to pass through the water inlet filter 4 and then enter the ultrafiltration membrane module 9 through the first water inlet pipeline 8. The production water flows from the water outlet of the ultrafiltration membrane module to the backwash tank 28 through the water production pipeline. In this process, an initial flow for a water inlet filtration is Qi m³/h (a corresponding operating membrane flux is 55 lmh).

When the water inlet filtration is performed for 45 min, the dosing control system starts a backwash. Before the backwash, the water supply pump 3 and the first dosing assembly are stopped, and then the first water inlet automatic valve 6 and the water production automatic valve 13 are turned off. The second water inlet automatic valve 14, a backwash drainage automatic valve 10 and the backwash pump 27 is turned on for starting the backwash. Backwash inlet water, that is, ultrafiltration production water, is pressurized and lifted by the backwash pump 27 to flow from the third water inlet pipeline 20 to the water production pipeline 16 to enter the ultrafiltration membrane module 9 in a reverse direction, so as to perform the backwash on the ultrafiltration membrane module 9. Wastewater produced during the backwash is discharged through the backwash drainage pipeline 11. The backwash is stopped after being performed for 40-50 s. At this time, the backwash pump 27, the second water inlet automatic valve 14 and the backwash drainage automatic valve 10 are sequentially turned off.

When the filtration-backwash is performed 24-36 times, a chemically enhanced backwash is operated. Before the chemically enhanced backwash, and inlet water filtration is stopped. A backwash is carried out before the chemically enhanced backwash, and operations of the backwash before the chemically enhanced backwash is basically the same as those of the backwash in the filtration-backwash. After the backwash before the chemically enhanced backwash, and water is injected and a chemical is added. The second water inlet automatic valve 14 and the backwash drainage automatic valve 10 remain on, and a frequency of the backwash pump 27 is reduced such that a flow of the injected water is equal to a half of a flow of backwash water. At the same time, the second dosing assembly 24 for the chemically enhanced backwash is turned on to start dosing. When a dosing duration is over, the backwash pump 27 and the second dosing assembly 24 are turned off, and then the second water inlet automatic valve 14 and the backwash drainage automatic valve 10 are turned off to start a soaking before the chemical enhanced backwash. After soaking for 10 min, and the dosing control system starts the chemical enhanced backwash. Operations of the chemical enhanced backwash are the same as those of the backwash the filtration-backwash process. Then cleaning through the chemically enhanced backwash is finished.

A finish of the chemically enhanced backwash means an end of a program-controlled operation cycle, and then the dosing control system will start a new program-controlled operation cycle.

In a program-controlled operation cycle, a program-controlled system gives a dosage of a flocculant as 0.2-1.0 mg/L according to a preset work condition and a quality of raw water for the first filtration. The preset work condition includes an operating membrane flux, a filtration duration, a backwash duration and an interval of the chemically enhanced backwash. The quality of the raw water includes a type of the raw water, a pretreatment process, an influent turbidity and an influent temperature.

It is supposed that a first differential pressure before an initial backwash in each chemically enhanced backwash cycle is $P_1$; the number of the filtration-backwash in each chemically enhanced backwash cycle is M; and an allowable differential pressure before the $M^{th}$ backwash is $P_M$, and therefore an allowable differential pressure before the $N^{th}$ ($1 \leq N \leq M$) backwash is calculated as follows: when N=1, $P_N = P_1$; when $1 < N \leq M$, $$P_N = P_1 + \frac{P_M - P_1}{M - 1} \times (N - 1).$$

At the beginning of the program-controlled operation cycle, a default state is that a dosing operation is performed, and a dosing duration is 10 min.

During the program-controlled operation cycle, a predicted differential pressure $P_{Npredicted}$ before the $N^{th}$ backwash is obtained according to a differential pressure curve formed by online filtering differential pressure data during the $N^{th}$ filtration of the ultrafiltration system.

When a cumulative duration that $P_{Npredicted}$ is less than or equal to $P_N$ reaches 5 min, the dosing operation is stopped.

When a cumulative duration that $P_{Npredicted}$ is greater than $P_N$ reaches 3 min, the dosing operation is continued and a dosage is increased by 0.05 ppm, and a timing operation is started at this time. Every 10 min is a stage, and a dosing duration for each stage is no less than 10 min. If $P_{N\,predicted}$ is still greater than $P_N$ after dosing for 10 min in one stage, the next stage is entered to continue the dosing operation and the dosage should be increased by 0.05 ppm; and when cumulative duration that $P_{N\,predicted}$ is less than or equal to $P_N$ reaches 5 min, the dosing operation is stopped. If a state of $P_{N\,predicted} \leq P_N$ occurs between two stages and a cumulative duration that $P_{N\,predicted}$ is less than or equal to $P_N$ in a former stage is less than 5 min, the timing operation will not be reset and will be continued in a later stage; and when the cumulative duration that $P_{N\,predicted}$ is less than or equal to $P_N$ reaches 5 min and the dosing duration for the latter stage is over, the dosing operation is stopped.

During the dosing, if the cumulative duration that $P_{N\,predicted}$ is less than or equal to $P_N$ reaches 5 min, and then the cumulative duration that $P_{N\,predicted}$ is greater than $P_N$ reaches 3 min within the dosing duration of 10 min in one stage, the dosing duration of this stage will be extended until the end of the filtration and the dosage will no longer be increased according to the differential pressure control. At the same time, the dosing control system determines there is a dosing failure and generates an alarm to allow an operator to check whether a dosing state is normal.

During the program-controlled operation cycle, unless the dosing operation is stopped manually, the dosing operation is automatically controlled by a precise intelligent dosing system and the dosage should not exceed an upper limit of a preset value such as 1.0 ppm.

A value of $P_1$ and a value of $P_M$ are set according to an actual situation. When an accumulated operating duration of the ultrafiltration membrane module 9 is less than 3 months and the work condition is good, the value of $P_1$ is 0.2 bar and the value of $P_M$ is 0.3 bar. When the accumulated operating duration of the membrane element is more than 3 months and the work condition is good, the value of $P_1$ is 0.25 bar and the value of $P_M$ is 0.35 bar. When the accumulated operating duration of the membrane element is more than 3 months and the work condition is poor, the value of $P_1$ is 0.3 bar and the value of $P_M$ is 0.4 bar.

The influent turbidity is a factor influencing the dosage. The dosage (calculated in terms of aluminum) is different according to the influent turbidity. When the influent turbidity is below 1 NTU, the dosage is 0.2 ppm; when the work condition is good, the influent turbidity is 10 NTU and the dosage is 0.5 ppm; when the work condition is poor, the turbidity is 10 NTU and a maximum dosage is 1.0 ppm. Therefore, when the preset work condition is good, the dosage=0.2+(0.5−0.2)÷9×(the influent turbidity−1). It is supposed that the dosage is m (PAC), and then the formula is simplified as: m (PAC)=0.2+1/30×(the influent turbidity−1). When the preset work condition is poor, the dosage is gradually increased from a value of the dosage when the work condition is good.

In general, it is not recommended to preset a poor work condition.

Further, it is recommended to take 0.05 ppm as a dosage gradient for the dosing operation.

The influent temperature is also a factor influencing the dosage. If the influent temperature is desirable, the dosage maintains the value mentioned above. If the influent temperature is undesirable that 12° C. is a benchmark, and the dosage will increase by 0.05 ppm for every 6° C. decrease.

A quality of the work condition is determined comprehensively according the preset work condition. When the operating membrane flux, the filtration duration, the backwash duration and the interval of the chemically enhanced backwash are all optimal values, the work condition is good, otherwise the work condition is poor.

The dosing control method and the dosing control system realize a precise control of an automatic dosing through intelligent prediction and control optimization.

Compared with the conventional dosing method, the dosage of a flocculant (calculated in terms of an effective metal ion) in micro-flocculation using the method provided herein is relatively stable and not greater than 1.0 mg/L, and the consumption the flocculant over the whole filtration process is reduced by nearly 50%.

According to the dosing control method and system, an example of an operation process of the dosing control system is illustrated as follows:

An influent turbidity is about 7 NTU, and an influent temperature is 20° C. A preset work condition is as follows: operating membrane flux: 65 lmh; filtration duration: 60 min; backwash duration: 30 s; and an interval of a chemically enhanced backwash: 36 h (accordingly, the filtration-backwash is performed 36 times). Accordingly, an initial dosage for an ultrafiltration is 0.75 mg/L.

In this embodiment, an ultrafiltration system has been operated for more than 3 months, such that a work condition is poor according to the preset work condition.

Therefore, a differential pressure $P_1$ before an initial backwash in each program-controlled operation cycle is 0.3 bar, and an allowable differential pressure $P_{36}$ before the 36th backwash is 0.4 bar.

The ultrafiltration system is turned on, and an initial filtration of inlet water is started, where a filtration flow of the inlet water is 208 m³/h; a chemical is added synchronously with a dosage of 0.75 mg/L; and an initial transmembrane differential pressure of the ultrafiltration system is 0.20 bar. After the initial filtration is continued for 10 min (a first dosing duration), the transmembrane differential pressure rises to 0.21 bar. At this time, the ultrafiltration system continues dosing and starts monitoring and providing a first feedback in real time. When the initial filtration is continued for 15 min, the transmembrane differential pressure rises to 0.22 bar, which is less than 0.3 bar, a program-controlled system automatically stops the dosing operation. The transmembrane differential pressure keeps stable in the rest of the initial filtration, and is 0.24 bar before backwashing. After the first filtration-backwash, the second filtration is started, and the initial transmembrane differential pressure is 0.21 bar. Similarly, the transmembrane differential pressure before a second filtration-backwash is 0.25 bar, and the chemical is added with a dosage of 0.75 mg/L. The dosing operation lasts for 15 min from the beginning of the filtration to the stop of dosing. After the second filtration-backwash, the transmembrane differential pressure recovers to 0.22 bar. The ultrafiltration system is continued to operate. For the 3rd to $10^{th}$ filtration-backwash, the transmembrane differential pressures before backwash are all less than 0.3 bar, and are 0.26 bar, 0.265 bar, 0.270 bar, 0.275 bar, 0.279 bar, 0.283 bar, 0.287 bar and 0.291 bar, respectively; and after the filtration-and-backwash, the transmembrane differential pressures recover to 0.23 bar, 0.235 bar, 0.240 bar, 0.245 bar, 0.249 bar, 0.253 bar, 0.257 bar and 0.261 bar, respectively.

The ultrafiltration system is continued to operate, and the $11^{th}$ filtration-backwash is carried out. The dosing operation lasts for 10 min (the first dosing duration) with a dosage of 0.75 mg/L. When the ultrafiltration system runs to the 14th minute, $P_{11\ predicted}$ (0.35 bar) is greater than $P_{11}$ (0.337 bar) and such state has lasted for no less than 3 min (the first preset duration). At this time, the dosage is increased by 0.05 mg/L and reaches 0.80 mg/L. The ultrafiltration system is continued to operate, and a timing operation is started and a dosing operation lasts for 10 min. When the ultrafiltration system runs to the 19th minute (that is, the 5th minute in the second dosing duration of 10 min), $P_{11\ predicted}$ (0.333 bar) is less than $P_{11}$ (0.337 bar), and then the ultrafiltration system starts monitoring and providing a second feedback for 5 min (the second preset duration) until the 24th minute (corresponding to the 10th minute of the second dosing duration of 10 min), during which a maximum $P_{11\ predicted}$ is 0.335 bar, which is smaller than $P_{11}$ (0.337 bar). The dosing operation is stopped at this time, the transmembrane differential pressure is 0.28 bar. The ultrafiltration system keeps running until the end of the filtration, that is the 60th minute, and the maximum transmembrane differential pressure is 0.293 bar, which is less than 0.3 bar and the $P_{11}$ (0.337 bar). After the 11th filtration-backwash, the transmembrane differential pressure recovers to 0.263 bar. The ultrafiltration system continues operating to the backwash before a chemically enhanced backwash. During the 12th to 36th filtration-backwash processes, the transmembrane differential pressure is relatively stable, ranging from 0.263 bar to 0.330 bar, and the maximum dosage is 0.80 mg/L. At an end of the 36th filtration-backwash, the ultrafiltration system carries out the chemically enhanced backwash. After the chemically enhanced backwash, the transmembrane differential pressure basically recovers to 0.21 bar. In the program-controlled operation cycle, the dosage is 0.75-0.80 mg/L, and the dosage duration accounts for 60% of a duration of the program-controlled operation cycle. In addition, an average dosage over the program-controlled operation cycle is 0.47 mg/L, which is far less than a conventional continuous dosage of 1.0 mg/L, reducing about 53% of chemical consumption.

It should be noted that relational terms such as "first" and "second" are merely used to distinguish an entity or an operation from another entity or another operation, and do not necessarily require or imply that there is an actual relationship or sequence between entities or operations. In addition, terms including "comprise", "include" or any other variation thereof are non-exclusive, which means that a process, a method, an article or a device comprising a list of elements includes not only those elements, but also includes elements that not explicitly listed or inherent elements of the process, the method, the article or the device. Unless otherwise specified, the limitation such as "comprise a . . . " does not exclude that the process, the method, the article or the device also includes another identical element.

Described above are only preferred embodiments of the present disclosure, and are not intended to limit the present disclosure. It should be understood that modifications, replacements and improvements made by those skilled in the art without departing from the spirit of the present disclosure should fall within the scope of the present disclosure defined by the appended claims.

What is claimed is:

1. A dosing control method for micro-flocculation in ultrafiltration, comprising the following steps:
   1) calculating a preset value of a first differential pressure before an initial backwash and a preset value of a second differential pressure before a final backwash in each chemically enhanced backwash cycle according to a work condition and quality of raw water;
   2) calculating a preset value of a third differential pressure between the first differential pressure and the second differential pressure according to the preset value of the first differential pressure and the preset value of the second differential pressure;
   3) starting a filtration system;
   4) obtaining a predicted value of the third differential pressure according to a differential pressure curve plotted based on online filtration differential pressure data;
   5) comparing the predicted value of the third differential pressure with the preset value of the third differential pressure to obtain a first judgement result, and recording a duration that the first judgement result remains unchanged;
   6) if the first judgement result indicates that the predicted value of the third differential pressure is greater than the preset value of the third differential pressure, and the duration that the first judgement result remains unchanged is less than a first preset duration, performing a dosing operation at a preset dosage;
   7) if the first judgement result indicates that the predicted value of the third differential pressure is greater than the preset value of the third differential pressure and the duration that the first judgement result remains unchanged is no less than the first preset duration, performing a dosing operation at an increased dosage; and
   8) if the first judgement result indicates that the predicted value of the third differential pressure is smaller than or equal to the preset value of the third differential pressure, and the duration is no less than a second preset duration, stopping the dosing operation, wherein the first, second, and third differential pressures are transmembrane differential pressures, and wherein the dosing operation is a flocculant dosing operation.

2. The dosing control method of claim 1, wherein the step (3) is performed through steps of:
   operating the filtration system; and
   performing the dosing operation at the preset dosage continuously dosing for a dosing duration.

3. The dosing control method of claim 1, wherein the step (7) further comprises:
   starting a timing operation with a preset dosing duration as a timing cycle;
   continuously performing the dosing operation in each timing cycle;
   monitoring the predicted value of the third differential pressure in real time comparing the predicted value of the third differential pressure with the preset value of the third differential pressure in real time to obtain a second judgement result; and
   recording a duration that the second judgement result keeps unchanged;
   if the second judgement result indicates that the predicted value of the third differential pressure is less than or equal to the preset value of the third differential pressure within one timing cycle, and the duration that the second judgement result keeps unchanged is not less than the second preset duration, stopping the dosing operation;
   if the second judgement result indicates that the predicted value of the third differential pressure is greater than the preset value of the third differential pressure at an end of one timing cycle, performing the dosing operation at an increased dosage; and
   if the second judgement result indicates that the predicted value of the third differential pressure is less than or equal to the preset value of the third differential pressure within one timing cycle, the judgement result is kept until an end of one timing cycle, and the duration that the second judgement result remains unchanged is less than the second preset duration, performing the dosing operation at an increased dosage and continuing performing the timing operation; and when the duration that the second judgement result remains unchanged is no less than the second preset duration, stopping the dosing operation.

4. The dosing control method of claim 3, wherein the preset dosing duration is greater than the first preset duration.

5. The dosing control method of claim 4, further comprising:
   if a cumulative duration that the predicted value of the third differential pressure is less than or equal to the preset value of the third differential pressure is no less than the second preset duration within the preset dosing duration, and then a cumulative duration that the predicted value of the third differential pressure is greater than the preset value of the third differential pressure is no less than the first preset duration, dosing time is extended, and a dosage is no longer controlled according to a differential pressure until an end of a filtration.

6. The dosing control method of claim 5, further comprising:
if a cumulative duration that the predicted value of the third differential pressure is less than or equal to the preset value of the third differential pressure is no less than the second preset duration within the preset dosing duration, and then a cumulative duration that the predicted value of the third differential pressure is greater than the preset value of the third differential pressure is no less than the first preset duration, a dosing failure is determined, and an alarm is generated to allow an operator to check a dosing condition.

* * * * *